United States Patent
Marusi et al.

(10) Patent No.: US 7,633,681 B2
(45) Date of Patent: Dec. 15, 2009

(54) MULTILAYER INTERFERENCE FILTER FOR PHOTOCHROMIC LENSES

(75) Inventors: Graziano Marusi, Parma (IT); Federico Menta, Parma (IT); Paolo Baiocchi, Parma (IT)

(73) Assignee: Intercast USA, Inc., Plymouth, MA (US)

(*) Notice: Subject to any disclaimer, the term of this patent is extended or adjusted under 35 U.S.C. 154(b) by 0 days.

(21) Appl. No.: 10/810,049

(22) Filed: Mar. 26, 2004

(65) Prior Publication Data
US 2004/0240067 A1   Dec. 2, 2004

Related U.S. Application Data

(60) Provisional application No. 60/457,882, filed on Mar. 26, 2003, provisional application No. 60/458,125, filed on Mar. 27, 2003.

(51) Int. Cl.
*G02B 1/10* (2006.01)
*F21V 9/04* (2006.01)

(52) U.S. Cl. .................. 359/587; 359/359; 359/581

(58) Field of Classification Search ......... 359/350–361, 359/557–590
See application file for complete search history.

(56) References Cited

U.S. PATENT DOCUMENTS

| | | | | |
|---|---|---|---|---|
| 3,410,625 A * | 11/1968 | Edwards | ...................... | 359/359 |
| 4,805,989 A * | 2/1989 | Nakajima | .................... | 359/584 |
| 4,852,974 A * | 8/1989 | Melzig et al. | ............... | 359/580 |
| 5,381,193 A * | 1/1995 | Wedding | .................... | 351/163 |
| 5,661,596 A * | 8/1997 | Biro et al. | ................... | 359/359 |
| 6,175,450 B1 * | 1/2001 | Andreani et al. | ............ | 359/586 |
| 6,926,405 B2 * | 8/2005 | Ambler et al. | ............... | 351/163 |

* cited by examiner

*Primary Examiner*—Thong Nguyen
(74) *Attorney, Agent, or Firm*—Stroock & Stroock & Lavan LLP

(57) ABSTRACT

A multi-layer thin film is provided preferably for use with photochromic lenses, wherein the thin film comprises a plurality of layers, preferably including dielectric layers, selected and arranged so as to reflect less than about 6 percent of the UVA rays in a range of about 315 to 400 nm, more preferably about 350 to 380 nm. The thin film preferably has an activation value greater than 25%.

25 Claims, 7 Drawing Sheets

FIG. 1 Silver Mirror (PRIOR ART)

FIG. 2 Antireflective Coating (PRIOR ART)

FIG. 3 White Silver Decorative Coating (PRIOR ART)

FIG. 4 EXAMPLE 1

FIG. 5 EXAMPLE 2

FIG. 6 EXAMPLE 3

US 7,633,681 B2

MULTILAYER INTERFERENCE FILTER FOR PHOTOCHROMIC LENSES

CROSS-REFERENCE TO RELATED APPLICATION

This application claims the benefit of U.S. Provisional Application Ser. Nos. 60/457,882, filed Mar. 26, 2003 and 60/458,125, filed Mar. 27, 2003, both of which are entitled MULTILAYER INTERFERENCE FILTER FOR PHOTOCHROMIC LENSES, which are incorporated herein by reference.

FIELD OF THE INVENTION

The present invention relates to optical-quality, multi-layer interference films, and, in particular, to optical quality multi-layer interference films for use with photochromic sunglass lenses, ophthalmic lenses, visors, masks, screens and the like.

BACKGROUND OF THE INVENTION

High vacuum vapor deposition is used for the production of thin film layers for many industrial applications. In the optics field, sophisticated coating designs consisting of up to 100 single layers are employed in the production of multi-layer interference filters and antireflection coatings for use with prescription and sunglass lenses.

Evaporants are metals, alloys and inorganic compounds generally named "dielectrics". Metals and alloys are "absorbing materials" and only in a very low thickness (few nanometers) are "semireflective". Dielectrics are transparent and, depending on the stack of layers employed, enhance various reflected colors (wave length). Stacks are formed by alternating layers of high and low refractive index dielectrics with different optical thickness. With a proper choice of evaporants, film thickness and number of transparent films, it is possible to design numerous types of optical thin films based on interference that meet precise performance demands with a variety of reflections.

Multilayer, antireflection and mirror coatings are commonly applied on a variety of ophthalmic and sunglass lenses, not only for aesthetic purposes, but also because in some cases they can increase lens performance. For example, an antireflection treatment on ophthalmic lenses and a mirror coating on sunglass lenses for high mountain sports can enhance lens performance.

Photochromic lenses, however, are not as compatible with these treatments. The treatment on the outer surface of photochromic lenses can significantly impede photochromic activity and inhibit darkening of the lenses when the lenses are exposed to sunlight.

Photochromic lenses are lenses that adapt their transmission to the variable light intensity while keeping the brightness on the eyes sufficiently constant. Photochromic lenses are useful when a big change of luminous intensity take place, for example, when getting out of the car and into the sunshine, or during open air activities such as activities on high mountains and at seaside resorts.

Photochromic lenses exhibit a reversible change in transmission when exposed to a light radiation involving ultraviolet rays, such as the ultraviolet radiation in sunlight or the light of a mercury lamp. Photochromic lenses can be made of glass or plastic, both of which work through the same principle: when they absorb specific wavelengths around the UVA (ultraviolet) range from about 315 to 380 nm, the photochromic molecules contained in the lens change their status and consequently cause the lens to darken.

These photochromic lenses are generally sold without any vacuum treatment on the surface because vacuum treatments generally absorb a significant percent of UVA radiation, which is responsible for the lens darkening. The most commercially available and common treatments, such as antireflective multilayer coating, colored multilayer coating, and mirror coating, can cause a significant reduction in the amount of UVA radiation of the sunlight spectrum being absorbed. Therefore, the photochromic lenses treated with the coating are less active than the photochromic lens that has not been treated with the coating.

The primary object of the present invention is to provide an optical-quality multi-layer treatment for use with a photochromic lens while sufficiently maintaining the photochromic activity of the lens. Other objects and features of the present invention will become apparent from the following detailed description, considered in conjunction with the accompanying examples. It is to be understood, however, that the examples are designed solely for the purpose of illustration and not as a definition of the limits of the invention, for which reference should be made to the appended claims.

SUMMARY OF THE INVENTION

The present invention relates to new optical-quality multi-layer interference films, and, in particular, to new optical-quality multi-layer interference films for use with photochromic sunglass and ophthalmic lenses, visors, masks, screens and the like. In particular, the present invention relates to new optical quality multi-layer interference films that are selected and deposited in such a way so as to not adversely affect the original photochromic activity of the lens. To obtain this objective, a preferred embodiment of the present invention is directed to a thin film having a plurality of layers of dielectrics which can maintain or enhance the penetration of UVA radiation preferably within a range from 315 to 400 nm, more preferably within a range from 350 to 380 nm, i.e., the interval of wavelengths responsible for the activation of the photochromic molecules.

BRIEF DESCRIPTION OF THE DRAWINGS

The particular features and advantages of the invention as well as other objects will become apparent from the following description taken in connection with the accompanying drawings, in which.

DETAILED DESCRIPTION OF THE PREFERRED EMBODIMENTS

The present invention relates to a new family of photochromic lenses coated on the surface with an original multilayer thin film treatment in such a way that the thin film does not adversely affect the original photochromic activity of the lens.

Several vacuum treatments for ophthalmic and sunglass lenses are commercially available, of which antireflection coatings, multilayer coatings, and mirror coatings are most prevalent. These treatments are designed to achieve a particular aesthetic effect on the lens by controlling the appearance of the lens, such as the color of the reflection of the lens or by providing a mirrored look. Preferably, certain embodiments of the invention exhibit a colored, silver and/or mirror like appearance when observed from a side opposite the lens.

Photochromic plastic lenses are produced using many different techniques. For example, the photochromic pigments can be dispersed on the surface of the lens using the imbibition process or they can be dissolved in the mass of the polymer as well. In some cases, the photochromic pigments can be included within a coating applied on the surface of the lens.

A variety of substrate materials can be used for the production of photochromic lenses. Preferred substrate materials include poly allildiglycol carbonate (ADC), polyurethane, polycarbonate and polyamide. It is well known that almost all photochromic dyes are activated by UVA light within a range from about 320 to 380 nm.

Conventional surface treatments, for example, antireflective or multi-layer coatings, absorb or reflect UVA light that is responsible of the activation of the photochromic dyes, thereby impeding the activation of the photochromic molecules and resulting in a low performance photochromic lens.

Figure 1:
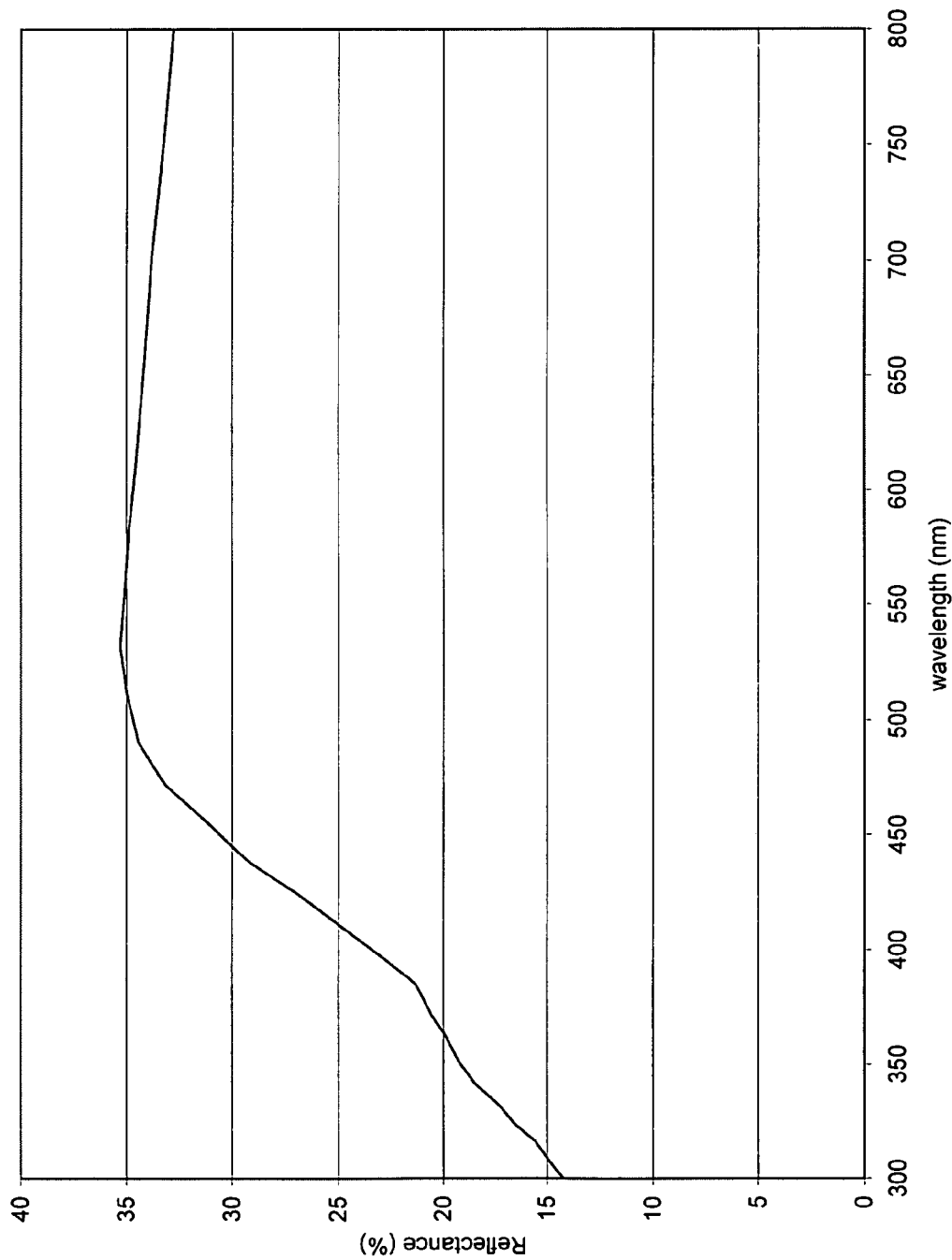
FIG. 1 is a reflectance curve of a lens coated with a prior art film.
Figure 2:
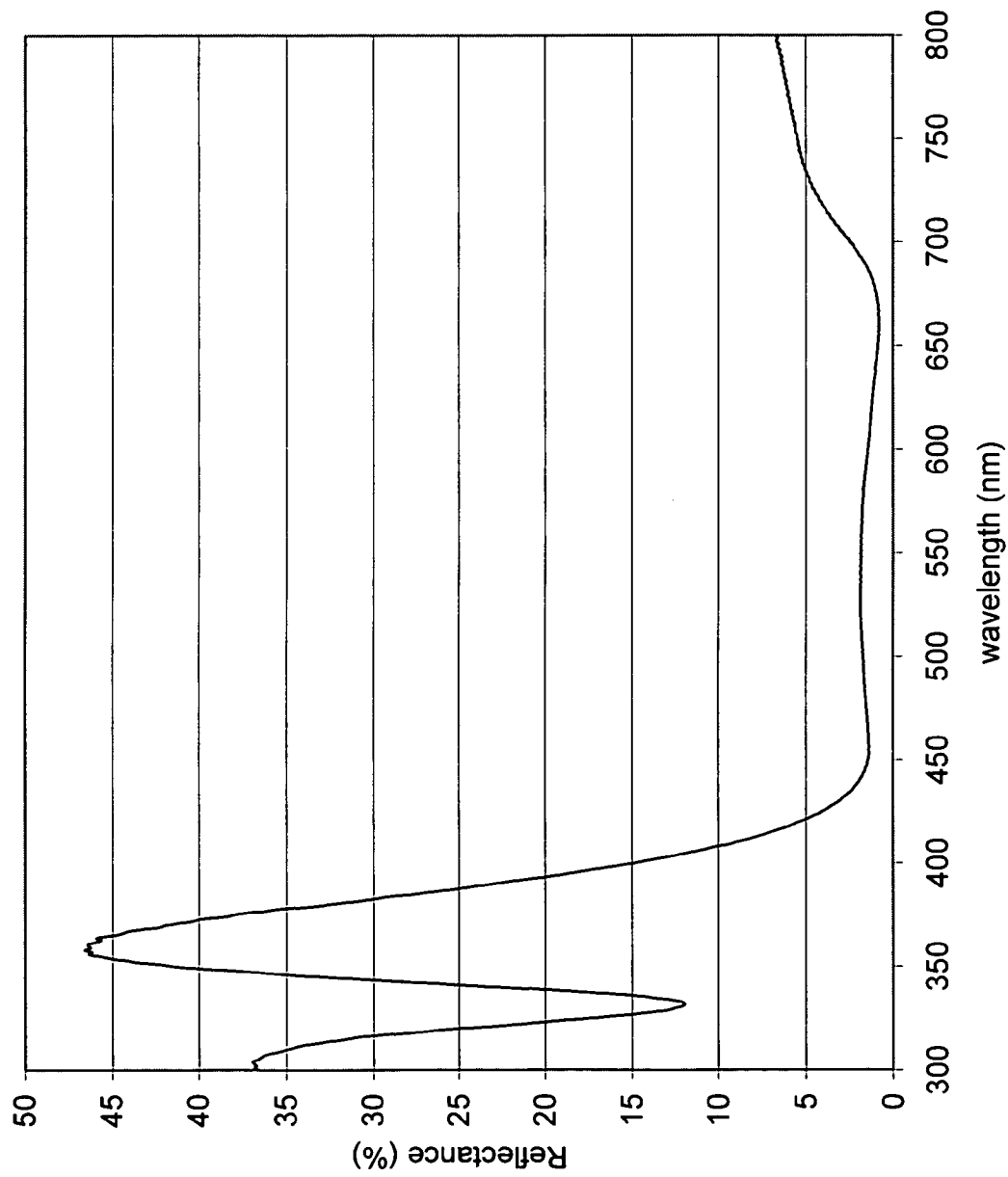
FIG. 2 is a reflectance curve of a lens coated with a prior art film.
Figure 3:
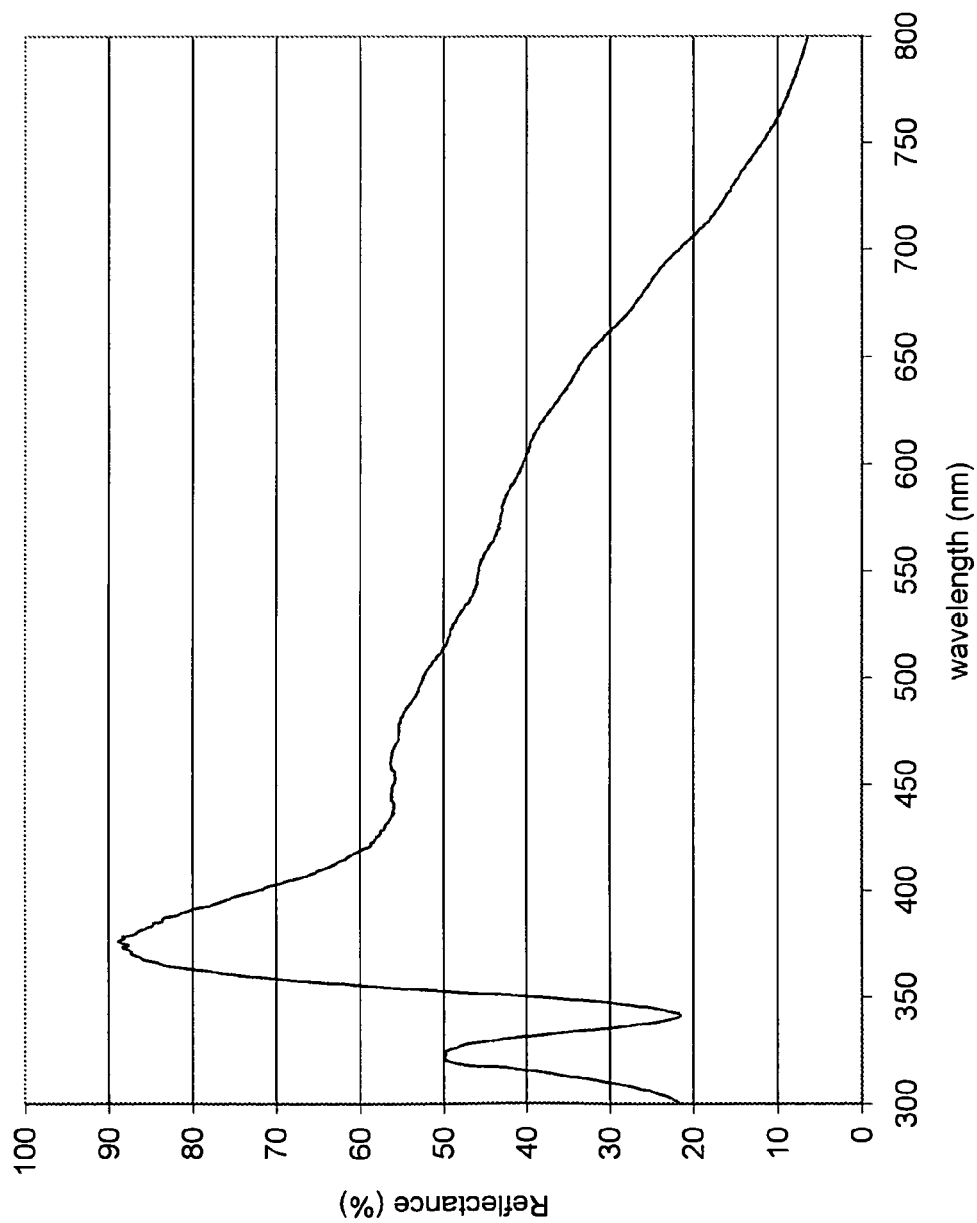
FIG. 3 is a reflectance curve of a lens coated with a prior art film.

FIGS. 1-3 show the reflectance curves of three examples of commercially available decorative or antireflective coatings. Each example can be obtained by performing a vacuum deposition of Chromium and/or Dielectric layers on a plastic lens. The example of FIG. 1, which is generally referred to as "Silver Mirror", comprises an ADC substrate coated with a total of about 10 nm of SiO and a total of about 8 nm of Cr. The example of FIG. 2 comprises a well known antireflective coating comprising six alternate layers of $SiO_2$ and $TiO_2$ deposited on a lens comprising ADC. The example of FIG. 3 comprises a lens comprising ADC having a decorative coating that is commercially known as "white silver" deposited thereon. The "white silver" coating provides the lens with a reflection cosmetically similar to the one of ice and comprises eight alternating layers of $SiO_2$ and $TiO_2$.

Referring to the three reflection curves shown in FIGS. 1-3, it is evident that a considerable part of UVA radiation is reflected. More specifically, broad bands of wavelengths in the range of 315 to 380 nm are reflected in an amount greater than 15%, more specifically between about 15 and 90%. This portion of UVA radiation is, therefore, not available to excite the photochromic dyes, thereby adversely affecting the performance of the photochromic lens.

In Table 1 below, the activation of the uncoated lens is compared to the activation of the same lens coated with the "White Silver" decorative coating shown in FIG. 3. As used herein, the term Photochromic Range or Activation is used to quantify the darkening of a photochromic lens and represents the ratio of the difference of the luminous transmittance in the faded state and the luminous transmittance in the darkened state to the luminous transmittance in the faded state, expressed as a percent. For example if a photochromic lens has a faded state transmission of 50% (i.e. when not exposed to the sun and thereby not exposed to the UVA radiation) and a darkened state transmission of 20% (i.e. when exposed to UVA radiation, i.e. when exposed to the sun), then the Activation as defined previously is 60%.

TABLE 1

| Photochromic Lens type | Uncoated lens Activation (%) | White Silver coated lens Activation (%) |
|---|---|---|
| ADC | 52% | 7% |

Owing to the high reflection of the UVA radiation (higher than about 40% averaged) in the interval of 315-380 nm, the activation % of the coated lens lowers from an original 52% of the uncoated lens to only 7% in the coated lens.

The applicants have unexpectedly found that it is possible to obtain photochromic lenses coated with specifically designed antireflective or decorative coatings ("the film") with either low or preferably no inhibition of photochromic Activation. The film is designed to reflect the spectral UVA radiation responsible for the photochromic activation in a range between 315 and 400 nm, preferably in an amount less than 15% and more preferably in an amount substantially equal to or less than the amount of UV light reflected by the uncoated lens, which is commonly calculated as about 6%. Therefore the film preferably has less than 15% of reflectance and more preferably has a 6% or less of reflectance of wavelengths preferably between 315 and 400 nm, and more preferably between 350 and 380 nm.

EXAMPLES

The following are examples of lenses coated with the film in accordance with preferred embodiments of the invention.

Figure 4:
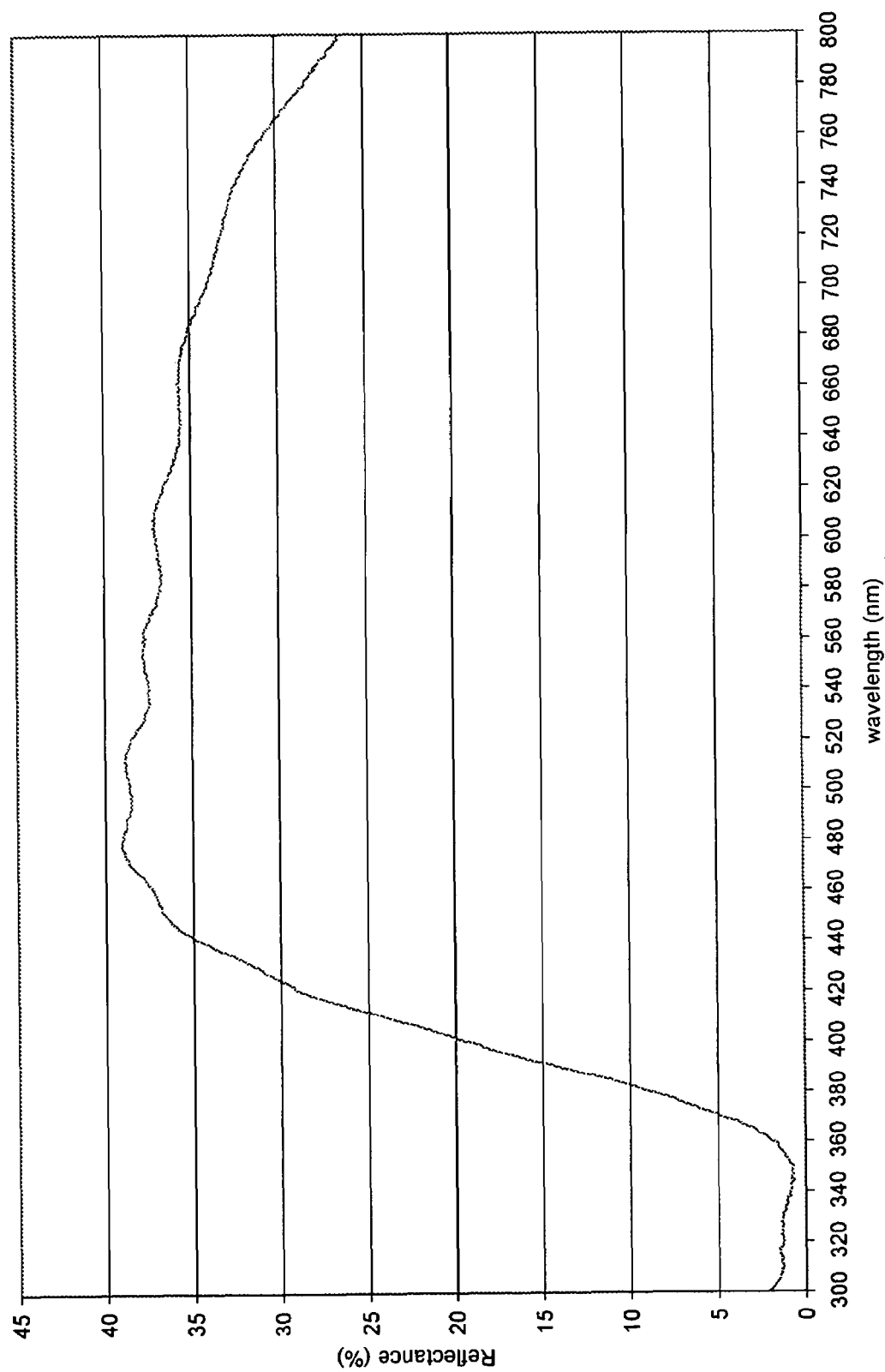
FIG. 4 is a reflectance curve of a lens coated with a film in accordance wit an embodiment of the invention.

Example 1 is a photochromic ADC lens coated with a film having less than 10% UVA reflectance in the range of about 350 to 380 nm, exhibiting the appearance similar to the prior art Silver Mirror lens of FIG. 1. The reflectance curve of Example 1 is shown in FIG. 4.

Example 1

The Silver Mirror effect is obtained by depositing the following 12 layers of $SiO_2$ and $TiO_2$ on an ADC lens:

| Layer | Material | Thickness (nm) |
|---|---|---|
| 1 | $TiO_2$ | 3.24 |
| 2 | $SiO_2$ | 22.41 |
| 3 | $TiO_2$ | 6.12 |
| 4 | $SiO_2$ | 21.21 |
| 5 | $TiO_2$ | 33.8 |
| 6 | $SiO_2$ | 14.94 |
| 7 | $TiO_2$ | 29.85 |
| 8 | $SiO_2$ | 102.42 |
| 9 | $TiO_2$ | 24.61 |
| 10 | $SiO_2$ | 7.53 |
| 11 | $TiO_2$ | 9.13 |
| 12 | $SiO_2$ | 29.38 |
| Medium: Air | | |

Table 2 below shows the activation % of Example 1 compared to the Activation of the same lens uncoated.

TABLE 2

| Photochromic lens type | Uncoated lens Activation (%) | Example 1 Activation (%) |
|---|---|---|
| ADC | 52% | 53% |

Figure 5:
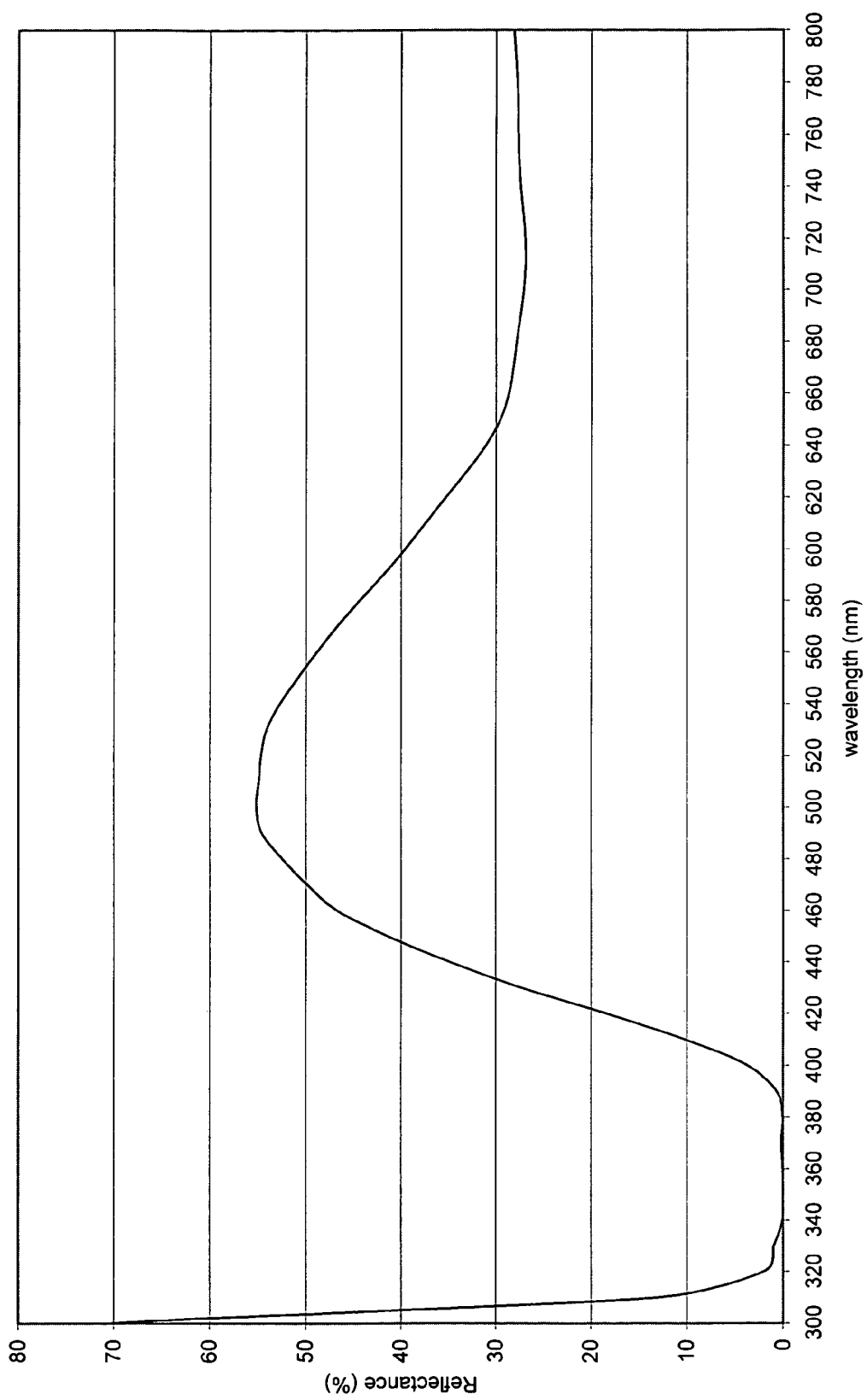
FIG. 5 is a reflectance curve of a lens coated with a film in accordance with an embodiment of the invention.

FIG. 5 shows the reflectance curve of example 2, which is an ADC lens coated with a film having a UVA reflectance of less than 6% in the range from about 315 to 400 nm, in accordance with an embodiment of the present invention. The film provides the lens with the appearance substantially resembling the prior art "White Silver" decorative coating of FIG. 3.

Example 2

The film, in accordance with an embodiment of the present invention, comprises the following 12 layers of $TiO_2$, $ZrO_2$ and $SiO_2$ dielectrics deposited on an ADC lens:

| Layer | Material | Thickness (nm) |
|---|---|---|
| 1 | $TiO_2$ | 4.35 |
| 2 | $SiO_2$ | 17.9 |
| 3 | $TiO_2$ | 9.59 |
| 4 | $SiO_2$ | 31.3 |
| 5 | $ZrO_2$ | 22.6 |
| 6 | $SiO_2$ | 29.7 |
| 7 | $TiO_2$ | 33.05 |
| 8 | $SiO_2$ | 106.66 |
| 9 | $TiO_2$ | 25.15 |
| 10 | $SiO_2$ | 22.95 |
| 11 | $ZrO_2$ | 10.23 |
| 12 | $SiO_2$ | 3.33 |
| | Medium: Air | |

Table 3 below shows the activation % of Example 2 compared to the activation % of the same lens uncoated and the same lens coated with the prior art "White Silver" coating.

TABLE 3

| Photochromic lens type | Uncoated lens Activation (%) | Lens coated with Example 2 Activation (%) | Lens coated with prior art "White Silver" coating Activation (%) |
|---|---|---|---|
| ADC | 52% | 52% | 7% |

Figure 6:
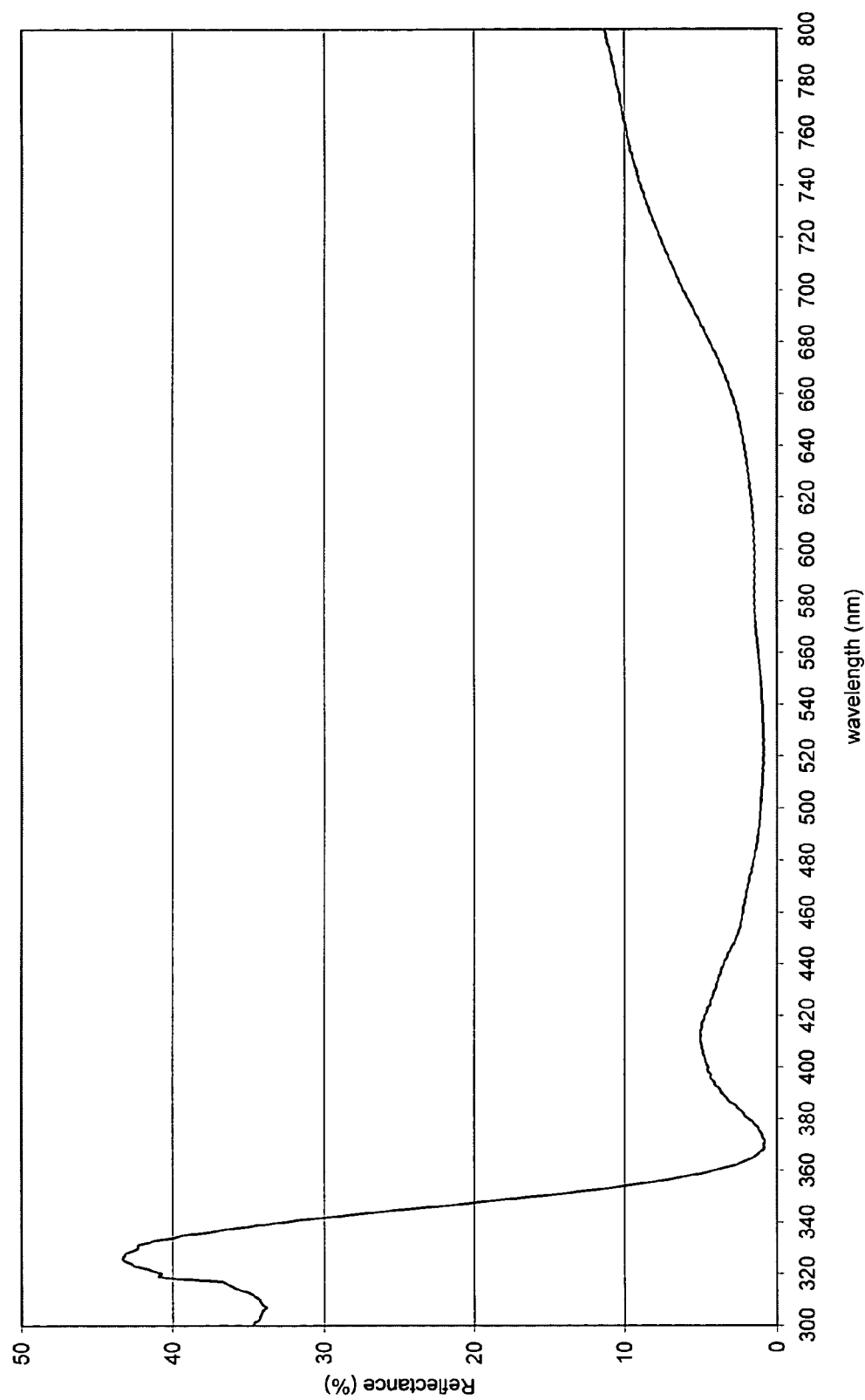
FIG. 6 is a reflectance curve of a lens coated with a film in accordance with an embodiment of the invention.
Figure 7:
FIG. 7 is a cross sectional view of a lens coated with a film in accordance with an embodiment of the invention.

FIG. 6 shows the reflectnce curve of Example 3, which is an ADC lens coated With an antireflective coating with a reflectance less than 15% in the range of about 350 to 400 nm, in accordance with an embodiment of the present invention. Referring to FIG. 7, dielectric layers 20, 30, 40, 50 are deposited on a lens 10. In accordance with an embodiment of the invention, dielectric layers 20, 40 comprise $TiO_2$ and dielectric layers 30, 50 comprise $SiO_2$.

Example 3

The antireflective coating is obtained depositing four alternating layers of $TiO_2$ and $SiO_2$ dielectrics on an ADC lens in the following order:

| Layer | Material | Thickness |
|---|---|---|
| 1 | $TiO_2$ | 12.26 |
| 2 | $SiO_2$ | 29.59 |
| 3 | $TiO_2$ | 90.69 |
| 4 | $SiO_2$ | 78.90 |
| | Medium: Air | |

Table 4 below shows the Activation of Example 3 compared to the same lens uncoated. The results of Table 4 illustrate that Example 3 permits the lens to be coated with an antireflective coating without losing any photochromic activation.

TABLE 4

| Photochromic lens | Uncoated lens Activation (%) | Example 3 Activation (%) |
|---|---|---|
| ADC | 52% | 52% |

The previous examples disclose three different multilayer coatings, in accordance with the invention, for use with photochromic lenses which do not adversely affect their photochromatic activity. This result is obtainable by selecting and arranging each layer in order to maintain the Reflectance preferably under 15% and more preferably under 6% preferably in the range from about 315 to 400 nm and more preferably in the range from about 350 to 380 nm. As shown in the examples, the reflectance of light in the visible spectrum in a range between 410 and 800 nm is equal to or greater than about 10%. The remaining unreflected UVA rays penetrate the lens surface and excite the photochromic dyes dispersed in the mass of the glass or polymer forming the lens.

A photochromic lens is commonly considered commercially interesting if the minimum activation value is not less than 25%. Moreover the European standard EN1836 states that a lens to be considered a photochromic lens has to show an Activation of not lower than 20%. The number of layers used in accordance with the invention to obtain said low reflection of UVA rays is not essential, as evident from the differing number of layers between Example 1 and 3. One method of calculating the proper optical design of layers needed is using a commercial Optical Coating Design Calculation Software depending on the dielectrics used and the desired effects, such as a mirror coating, an antireflection coating or a colored multi-layer.

Thus, the thin films of the present invention provide an improved coating for use with photochromic lenses and the like. While there have been shown and described and pointed out novel features of the present invention as applied to preferred embodiments thereof, it will be understood that various omissions and substitutions and changes in the form and details of the disclosed invention may be made by those skilled in the art without departing from the spirit of the invention. For example, the number of layers is not limited to tha disclosed in the examples described herein, and can include 100 of more layers without deviating from the scope of the invention. Furthermore, it may be preferable to provide a film having an activation value of greater than 90%, more prefetably greater than 97% of the photochromic lens which the film is applied. It is the intention, therefore, to be limited only as indicated by the scope of the claims appended hereto.

It is also to be understood that the following claims are intended to cover all of the generic and specific features of the invention herein described and all statements of the scope of the invention which, as a matter of language, might be said to fall there between. In particular, this invention should not be construed as being limited to the dimensions, proportions or arrangements disclosed herein.

We claim:

1. A light transmitting photochromic lens comprising photochromic dyes and having a visible colored appearance, the photochromic lens further comprising a multi-layer thin film coating applied on an outer surface thereof, the multi-layer thin film coating comprising a plurality of dielectric layers, wherein the film coating reflects an amount less than about 15% of spectral ultraviolet radiation in a range between 315 and 400 nm and reflects an amount equal to or greater than about 10% of light in the visible spectrum in a range between 410 and 800 nm so that the lens exhibits the visible colored appearance.

2. The lens of claim 1, wherein the colored appearance comprises a mirror like appearance.

3. The lens of claim 1, wherein the colored appearance comprises a white silver like appearance.

4. The lens of claim 1, wherein the multi-layer thin film coating reflects less than 6% of spectral ultraviolet radiation.

5. The lens of claim 1, wherein the plurality of dielectric layers comprises $SiO_2$ layers.

6. The lens of claim 1, wherein the plurality of dielectric layers comprises $TiO_2$ layers.

7. The lens of claim 1, wherein the plurality of dielectric layers are arranged to alternate low and high refractive indices.

8. The lens of claim 1, wherein the plurality of dielectric layers comprises $ZrO_2$ layers.

9. The lens of claim 1, wherein the plurality of dielectric layers comprises twelve layers.

10. The lens of claim 9, wherein the multi-layer thin film coating comprises a twelve layer arrangement comprising alternating $TiO_2$ and $SiO_2$ layers.

11. The lens of claim 10, wherein the dielectric layers are selected and arranged in a sequence: TiO2, SiO2, TiO2, SiO2, TiO2, SiO2, TiO2, SiO2, TiO2, SiO2, TiO2, SiO2, so as to obtain a silver mirror like appearance of the lens.

12. The lens of claim 9, wherein the multi-layer thin film coating comprises a twelve layer arrangement comprising $TiO_2$, $SiO_2$ and $ZrO_2$ layers.

13. The lens of claim 12, wherein the dielectric layers are selected and arranged in a sequence: $TiO_2$, $SiO_2$, $TiO_2$, $SiO_2$, $ZrO_2$, SiO2, TiO2, SiO2, TiO2, SiO2, ZrO2, SiO2, so as to obtain a silver mirror like appearance of the lens.

14. The lens of claim 1, wherein the plurality of dielectric layers comprises up to 100 layers.

15. The lens of claim 1, the lens having a photochromic range of greater than about 25%.

16. The lens of claim 1, the lens having a photochromic range of greater than about 40%.

17. The lens of claim 1, the lens having a photochromic range of greater than about 90%.

18. The lens of claim 1, the lens having a photochromic range of greater than about 97%.

19. The lens of claim 1, the lens having a photochromic range of approximately the activation value of the uncoated photochromic lens.

20. The lens of claim 1, wherein the lens is a sunglass lens.

21. A method of creating a light transmitting colored photochromic lens comprising photochromic dyes, the method comprising forming a photochromic lens part and applying a plurality of dielectric layers onto the outer surface of the photochromic lens part wherein the plurality of dielectric layers collectively reflect an amount less than about 15% of spectral ultraviolet radiation in a range between 315 and 400 nm and reflect an amount equal to or greater than about 10% of light in the visible spectrum in a range between 410 and 800 nm so that the lens exhibits a visible colored appearance.

22. The method of claim 21, further comprising applying a twelve layer arrangement comprising alternating $TiO_2$ and $SiO_2$ layers.

23. The method of claim 22, further comprising applying twelve layers of TiO2 and SiO2 on the photochromic lens in a sequence: TiO2, SiO2, TiO2, SiO2, TiO2, SiO2, TiO2, SiO2, TiO2, SiO2, TiO2, SiO2, in order to obtain a silver mirror like appearance.

24. The method of claim 21, further comprising applying a twelve layer arrangement comprising $TiO_2$, $SiO_2$ and $ZrO_2$ layers.

25. The method of claim 24, further comprising applying twelve layers of TiO2, SiO2 and ZrO2 on the photochromic lens in a sequence: TiO2, SiO2, TiO2, SiO2, ZrO2, SiO2, TiO2, SiO2, TiO2, SiO2, ZrO2, SiO2, in order to obtain a white silver like appearance.

* * * * *